Sept. 20, 1966  J. F. FLODIN  3,273,618
ASPARAGUS TRIMMER

Filed Feb. 26, 1964  3 Sheets-Sheet 1

John F. Flodin
INVENTOR.

BY Clarence A. O'Brien
and Harvey B. Jacobson
Attorneys

Sept. 20, 1966 J. F. FLODIN 3,273,618
ASPARAGUS TRIMMER
Filed Feb. 26, 1964 3 Sheets-Sheet 2

John F. Flodin
INVENTOR.

Sept. 20, 1966   J. F. FLODIN   3,273,618
ASPARAGUS TRIMMER

Filed Feb. 26, 1964   3 Sheets-Sheet 3

John F. Flodin
INVENTOR.

BY Clarence A. O'Brien
and Harvey B. Jacobson
Attorneys

United States Patent Office 3,273,618
Patented Sept. 20, 1966

3,273,618
ASPARAGUS TRIMMER
John F. Flodin, Sunnyside, Wash., assignor to Flodin Inc., a corporation of Washington
Filed Feb. 26, 1964, Ser. No. 347,439
7 Claims. (Cl. 146—81)

This invention relates to improvements in machines for handling and trimming articles or produce such as asparagus. More particularly, the machine of the present invention embodies improvements over machines of the type such as disclosed in Patent No. 2,800,939.

It is therefore a primary object of the present invention to provide a machine of the aforementioned type which is more versatile with respect to operational requirements and capable of handling trimming operations with increased efficiency and capacity.

As an important object of the present invention, the asparagus handling and trimming machine of the present invention provides facilities for more easily replacing the endless trimmer belts by means of which asparagus or similar articles are carried in proper position toward a trimming station at which the butts of the asparagus stalks are severed or at which trimming station other trimming operations are performed in connection with other produce such as broccoli, carrots, etc.

An additional object of the present invention is to provide an asparagus trimming or cutting machine capable of more efficiently facilitating the handling of produce such as asparagus brought to the processing plant in boxes or containers from which they are removed and transferred to the trimmer belts of the trimming machine. The machine of the present invention therefore features roller conveyors transversely tilted along the transversely tilted portions of the trimmer belts supporting containers loaded with the asparagus in positions to enable handlers to more readily transfer the asparagus to the trimmer belts.

A still further object of the present invention is to provide an asparagus trimming machine provided with a centrally located return conveyor by means of which unloaded containers may be returned toward the feeding station at which loaded containers are placed on the transversely tilted roller conveyors thereby enabling one person at the feeding station, to handle both loading of full containers and unloading of empty containers from the machine.

Yet another object of the present invention is to provide an improved asparagus trimming machine which features a novel trimmer belt construction and belt vibrating facilities reducing the vibration imparted to the machine support.

Other objects of the present invention include the construction of an improved asparagus trimming machine provided with novel trimmer assemblies by means of which multiple cuts may be made at different axial positions along the asparagus brought to the trimmer assemblies by the trimmer belts.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a partial side sectional view of the machine taken substantially through a plane indicated by section line 5—5 in FIGURE 2.

FIGURE 6 is an enlarged partial sectional view taken substantially through a plane indicated by section line 6—6 in FIGURE 5.

Figure 1:
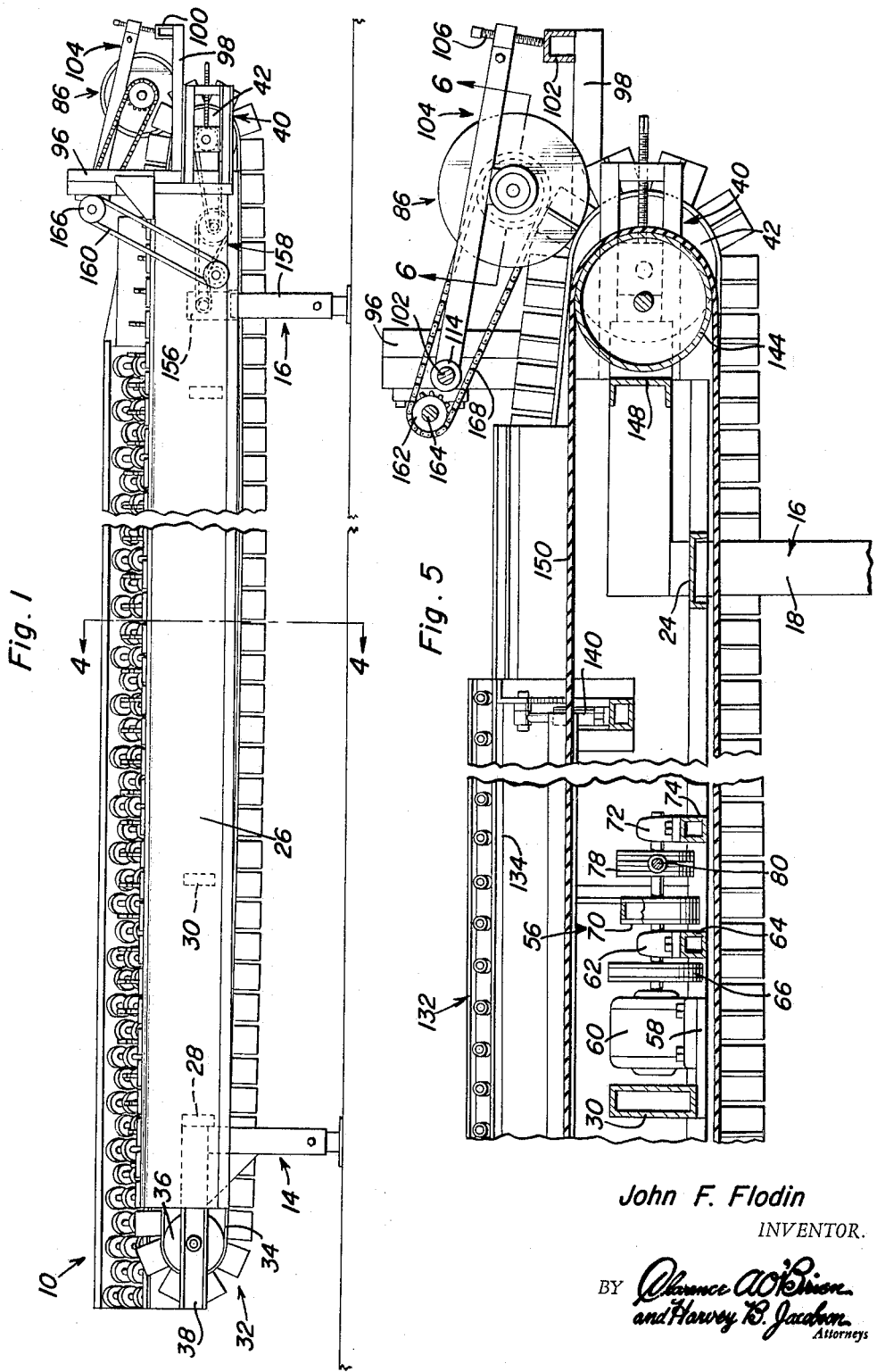
FIGURE 1 is a side elevational view of the asparagus trimming machine made in accordance with the present invention.
Figure 2:
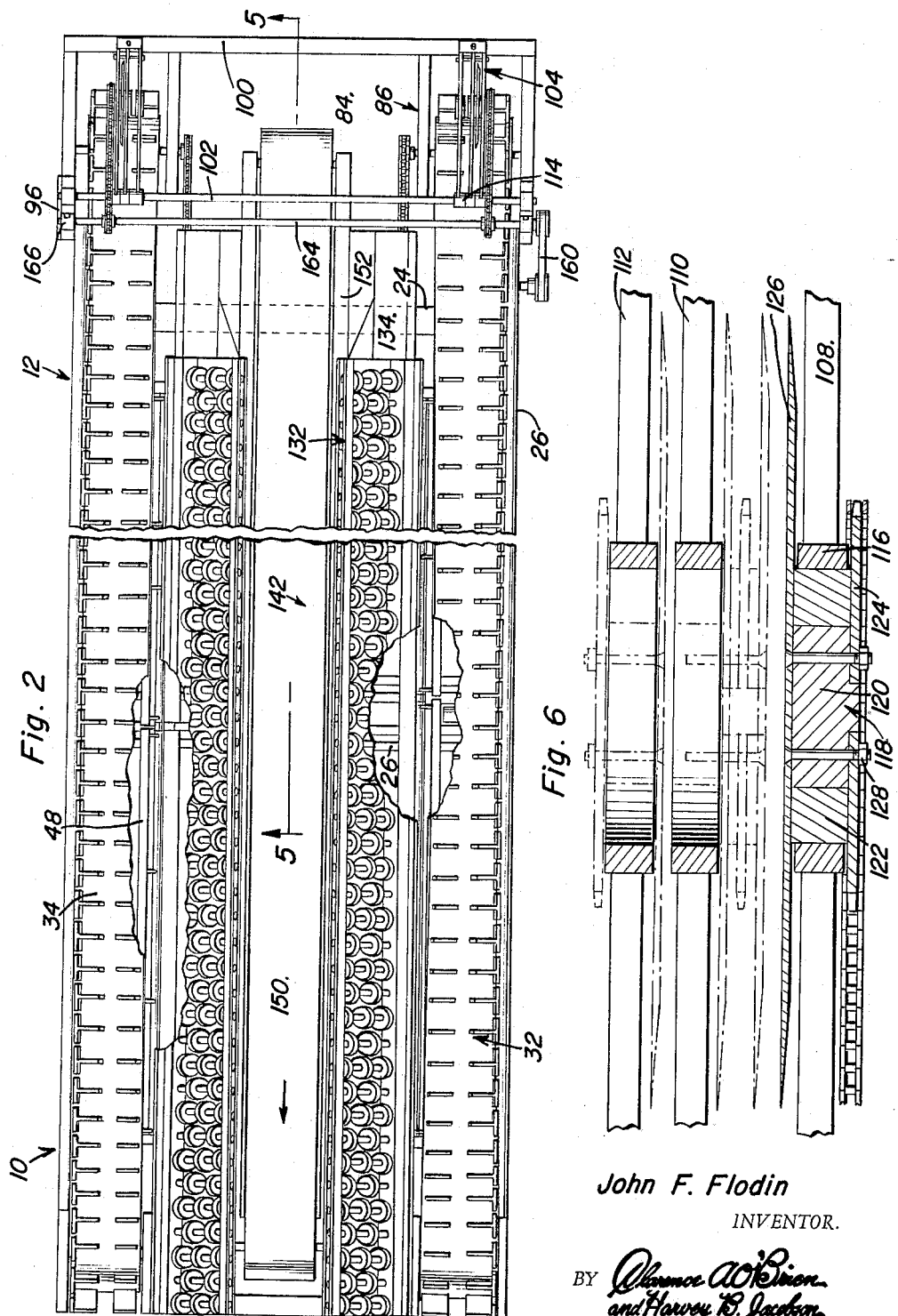
FIGURE 2 is a top plan view of the machine illustrated in FIGURE 1.
Figure 3:
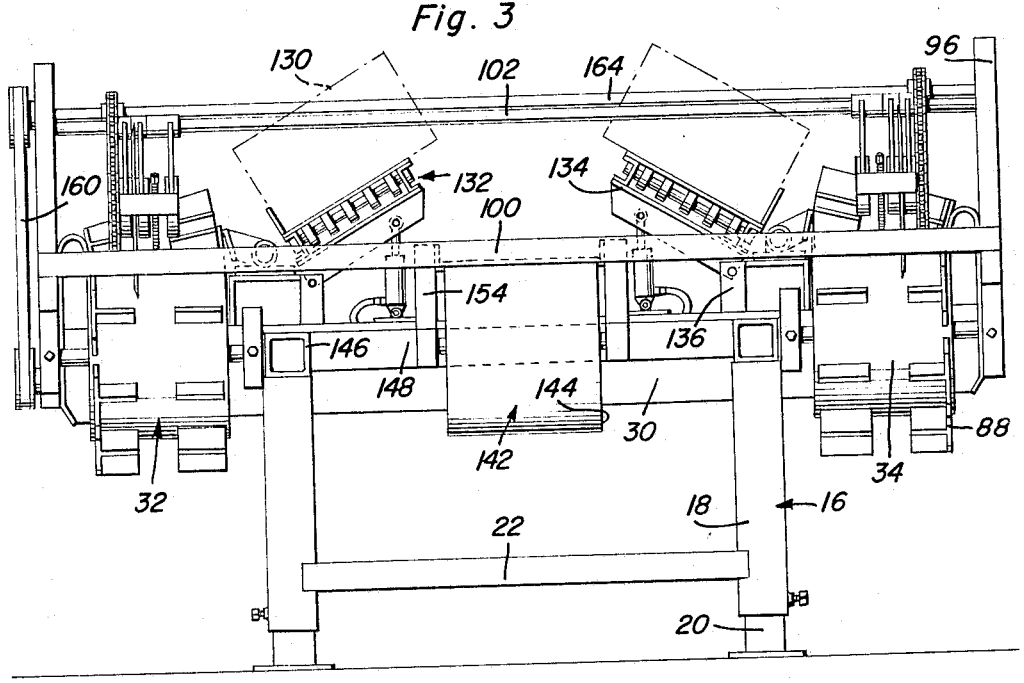
FIGURE 3 is a right end view of the machine as viewed in FIGURES 1 and 2.

Referring now to the drawings in detail, and initially to FIGURES 1, 2 and 3, it will be observed that the machine generally denoted by the reference numeral 10 includes a support assembly generally referred to by reference numeral 12 adjustably mounted above the floor by two pair of adjustable leg assemblies 14 and 16. Each pair of leg assemblies include tubular post members 18 from which extensible foot portions 20 extend, the tubular post members of each pair of leg assemblies being interconnected by cross frame members 22 as more clearly seen in FIGURE 3. A cross channel member 24 as more clearly seen in FIGURES 2 and 5, interconnects the upper ends of the tubular post members 18 of the extensible leg assemblies 16 and extends transversely therebeyond for connection to and support of a pair of side plate members 26 which extend longitudinally beyond the leg assemblies 14 and 16. Also interconnecting the tubular post members of the extensible leg assemblies 14 and extending transversely therebeyond, is a cross frame member 28 shown by dotted line in FIGURE 1 to which the side plate members 26 are connected for support by the leg assemblies 14. Additional transversely extending side frame members 30 interconnect the side plate members 26 as shown in FIGURES 1 and 3. The side plate members are therefore supported on the support frame assembly 12 transversely spaced beyond the leg assemblies 14 and 16 thereof so as to support a pair of trimmer belt assemblies 32 on longitudinally opposite sides of the support assembly facilitating removal and replacement of the endless trimmer belts 34.

Each of the trimmer belt assemblies 32 extends from one end of the machine at a container-loading and removing station by being entrained about an end idler pulley 36 rotatably mounted about a fixed horizontal axis extending through a shaft supported between a pair of horizontal frame members 38 which extend longitudinally beyond the side plate members 26 and are supported by the tubular post members of the leg assemblies 14. At the opposite end of the machine, each of the belt assemblies 32 has associated therewith slack take-up mechanisms 40 as more clearly seen in FIGURES 1 and 5 which rotatably mount conveyor drive pulleys 42. Connected to each of the side plate members 26, are longitudinal conveyor supporting members 44 which rotatably mount a plurality of supporting rollers 46 as more clearly seen in FIGURE 4 extending at an upward incline from the side plate members. Thus, the endless trimmer belts 34 entrained about the idler pulleys 36 and drive pulleys 42 are supported along the upper run portion spaced from the opposite ends of the machine in a transversely tilted condition. Also engaging the trimmer belts 34 along the upper run portion which are in the transversely tilted condition, are supporting rail members 48. The rail members are connected to tubular shafts 50 rotatably mounted by spaced journal assemblies 52 mounted on the supporting frame assembly for pivotal movement. Accordingly, a pair of lever elements 54 are secured to the tubular shaft members 50 extending downwardly therefrom intermediate the ends of the machine as more clearly seen in FIGURE 4 so that oscillatory movement may be imparted to the lever elements in order to vibrate the trimmer belts engaged by the rail members 48.

Figure 4:
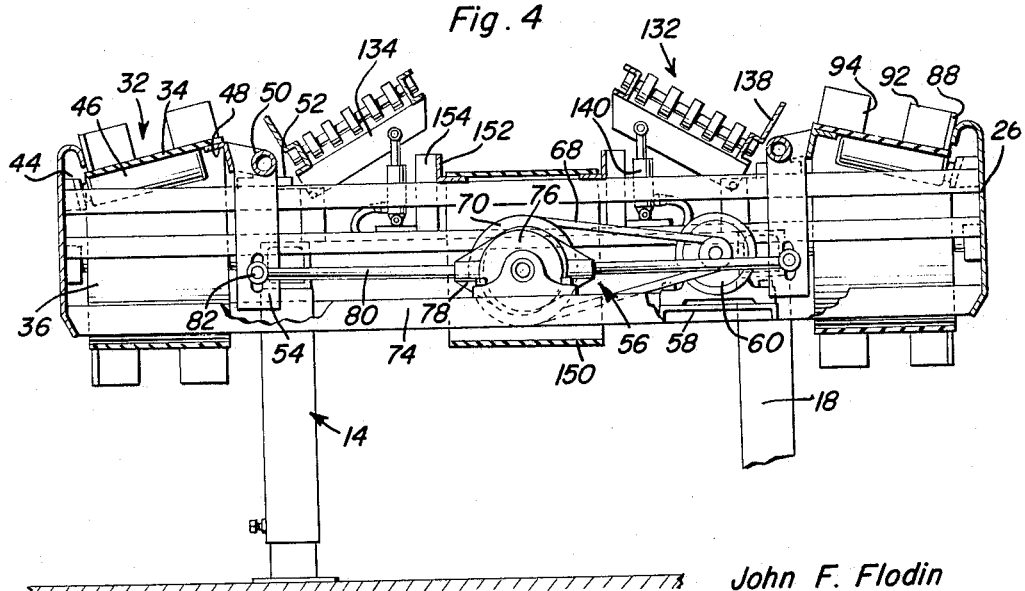
FIGURE 4 is a transverse sectional view through the machine taken substantially through a plane indicated by section line 4—4 in FIGURE 1.

Referring now to FIGURES 4 and 5 in particular, it will be observed that a shaker mechanism generally referred to by reference numeral 56 is mounted by the supporting frame assembly for imparting balanced oscillatory movement to the lever elements 54. Accordingly, a supporting base 58 is secured to one of the cross frame members 30 to which a drive motor 60 is bolted. The output shaft of the drive motor 60 is supported by a journal assembly 62 secured to a cross frame member 64 interconnected between the side plates 26. Secured to the output shaft of the drive motor is a drive pulley 66 about which a drive belt 68 is entrained, the belt 68 also being entrained about a driven pulley 70 having a shaft supported in journal assembly 72 secured to the cross frame member 74 interconnected between the side plate members 26. Driven pulley 70 is therefore interconnected with an eccentric drive member 76 rotatably mounted within an eccentric strap 78 to which a pair of connecting rods 80 are secured. The connecting rods 80 extend from the eccentric strap element 78 in opposite directions for connection to the lever elements 54 through pin and slot connections 82 in order to impart oscillatory movement thereto. It will therefore be apparent, that the oscillatory movement imparted to the lever elements producing vibration of the trimmer belts is accomplished with minimum vibration in the support assembly since the oscillatory movements are balanced. Accordingly, the shaker mechanism 56 may efficiently impart vibratory movement to the trimmer belts in order to properly position the asparagus on the upper run of the trimmer belts so that they may be conveyed toward the trimming station 84 located at one end of the machine at which station a pair of trimmer assemblies 86 are mounted.

In order to retain the asparagus in proper position on the trimmer belts, the trimmer belts 34 are provided with spaced wall elements 88 disposed adjacent the laterally outer edges 90 of the belts. Extending transversely of the belts from the wall elements 88, are divider elements 92 having gaps 94 therein with which the trimmer assemblies are alined for cutting the asparagus retained in the pockets formed between the wall elements 88 and the divider elements 92. It will therefore be apparent, that as the trimmer belts move along the upper run portion supported by the inclined rollers 76, and are vibrated by the shaker mechanism 56, the asparagus transferred to the trimmer belts will be settled in proper position so that when the asparagus carried by the trimmer belts toward the trimming station 84 are brought to a horizontal position they will be properly alined with the trimmer assemblies 86 for cutting thereof.

Referring now to FIGURES 1, 2, 5 and 6, it will be observed that the trimmer assemblies 86 are supported by a pair of upstanding frame members 96 secured to the ends of the side plate members 26 and by a pair of horizontal members 98 extending longitudinally from the side plate members, said members 98 being interconnected by a transversely extending frame member 100. A pivot shaft 102 extends transversely between the vertical upstanding frame members 96 so as to pivotally mount an adjustable supporting assembly 104 in alinement with the gaps in the divider elements 92 of the trimmer belts 32. Accordingly, each pivotal supporting assembly includes an adjustment screw member 106 engaged with the transverse frame member 100 for adjustable support of the trimmer assembly at the proper elevation. The pivotal support assembly 104 as more clearly seen in FIGURE 6, includes a plurality of supporting arms 108, 110 and 112 connected in common to the pivot sleeve 114 associated with the support assembly 104, for simultaneous pivotal adjustment. Each supporting arm is secured to a journal sleeve 116 adapted to receive a hub assembly 118. The hub assembly therefore includes a holding block 120 on which there is held assembled a bearing ring 122 between a drive sprocket 124 and a saw blade 126 interconnected with the drive sprocket by the fastener assemblies 128. It will therefore be apparent, that one or more blades may be mounted in different axial positions on the adjustable support assembly 104 in order to sever the asparagus as the rotatable saw blade moves through the gaps 94 in the divider elements 92 on the trimmer belts continuously moving the asparagus toward the trimming station 84. Accordingly, as the severed asparagus drop off the drive end of the trimmer belts, the severed portions may be separately collected. The pockets formed by the wall elements 88 and divider elements 92 on trimmer belts disposed in horizontal positions at the trimming station 84 will then return along the lower run of the trimmer belts toward the feeding end of the machine and then receive asparagus once again along the upper run of the trimmer belts disposed in the transversely tilted condition aforementioned.

The transfer of the asparagus to the transversely tilted portion of the trimmer belts, is conveniently performed by handlers standing on opposite longitudinal sides of the machine who reach over the trimmer belts to remove the asparagus from loaded containers 130 shown by dotted line in FIGURE 3, said containers being conveyed from the feeding end of the machine toward the trimming station 84 by a pair of roller conveyors 132. Each of the roller conveyors is of a conventional construction but includes elongated roller section supporting members 132 pivotally mounted along laterally outer edge portions by pivot brackets 136 secured to the supporting frame assembly. Longitudinal retaining elements 138 project upwardly from the laterally outer edge portion of the supporting members 134 of the roller conveyors in order to hold the loaded containers or boxes 130 thereon in a tilted position. The supporting members 134 are therefore maintained in an adjustably tilted position by controllable cylinder devices 140 pivotally anchored to the supporting frame assembly and pivotally connected to the underside of the conveyor supporting members 134 as more clearly seen in FIGURES 4 and 5. It will therefore be apparent, that boxes loaded with asparagus may be placed on the roller conveyors 132 at the feed end of the machine opposite the trimming station 84 so that the boxes may be slowly moved along the trimmer belt assemblies 32 in positions facilitating transfer of the asparagus therefrom by the handlers to the pockets formed on the upper run of the trimmer belts 34. When the boxes or containers 130 are emptied or unloaded, they may be returned to the feeding end of the machine.

In order to return the empty boxes to the feeding end of the machine, a continuously moving return conveyor 142 is provided. The return conveyor extends longitudinally between the parallel spaced roller conveyors 132 for this purpose. Accordingly, an idler pulley 144 is rotatably mounted between a pair of horizontal frame members 146 extending from the tubular post members 18 of the leg assemblies 16, said horizontal frame members 146 being interconnected by a cross channel member 148 as more clearly seen in FIGURES 3 and 5. A drive pulley is similarly supported at the opposite end of the machine so that an endless conveyor belt 150 may be entrained about the pulleys for continuous movement in the direction indicated by the arrows in FIGURE 2. The upper run of the conveyor belt 150 is therefore supported between a pair of side rail members 152 secured to vertically upstanding support elements 154. It will therefore be apparent, that a single handler at the feed end of the machine may both load full containers onto the trimmer belt assemblies 32 and remove empty containers from the return belt 150.

Referring now to FIGURES 1, 2, 3, and 5, it will be observed that a variable speed drive unit 156 may be supported between the vertical post members 18 of the extensible leg assemblies 16 in order to impart drive to the drive pulley 42 for operating the trimmer conveyor assemblies 32 by a drive assembly 158 also drivingly connected through the belt 160 for driving sprockets 162 fixed to the drive shaft 164 rotatably mounted between the journal assemblies 166 mounted on the frame members 96. Sprocket belts 168 may therefore be entrained about the drive sprockets 162 and one or more of the drive sprockets 124 associated with the saw blades 126 of the trimmer assemblies. Movement of the asparagus past the trimmer assemblies may therefore be correlated to the rotational speed of the saw blades in accordance with varying requirements. It will also be apparent, that the spacing of the saw blades from the trimmer belts may be adjusted by both the adjustment screw elements 106 and by the belt take-up mechanisms 40.

From the foregoing description, the construction, operation and utility of the asparagus trimming machine of the present invention and the improvements embodied therein will be apparent. It will therefore be appreciated, that the machine of the present invention may process asparagus or similar articles in a more efficient manner and may be utilized with greater capacity. Also, the arrangement facilitates repair and replacement of parts as well as adjustments for varying requirements so as to render the machine more versatile.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a machine for handling and trimming asparagus or similar articles, having a pair of parallel spaced trimmer conveyors transversely tilted between a feeding station and an unloading station which is spaced from a trimming station in the direction of conveyor movement, a pair of transversely tilted container supports mounted in parallel spaced relation between said trimmer conveyors to facilitate transfer of articles from loaded containers to the trimmer conveyors, said container supports extending from the feeding station to the unloading station, and continuously moving return means operatively mounted between the container supports for conveying unloaded containers, transferred thereto from the container supports, toward the feeding station at which the loaded containers are fed onto the container supports.

2. A machine for handling and trimming asparagus or similar articles comprising, an elongated support extending between a container loading station and an article severing station, container return means mounted by the support for continuously conveying unloaded containers toward the loading station, a pair of container supporting conveyors disposed on opposite longitudinal sides of the container return means adapted to convey loaded containers from the loading station toward the severing station, means mounting said container supporting conveyors in transversely tilted positions to facilitate removal of articles in the loaded containers from opposite longitudinal sides of the support, a pair of endless belts mounted along said opposite longitudinal sides of the support for easy removal, compartment means mounted on said belts for positioning articles transferred thereto from the loaded containers, means continuously moving said belts in transversely tilted condition along the container supporting conveyors toward the severing station, and severing means operatively mounted by the support at the severing station for cutting articles positioned in the compartment means.

3. The combination of claim 2 wherein said compartment means comprises, a plurality of spaced wall elements secured to each of said endless belts adjacent laterally outer edges thereof, and a divider element extending from each wall element transversely across the belt having a blade receiving gap through which the severing means passes as the endless belts move past the severing station.

4. The combination of claim 3 wherein said severing means comprises a pair of trimmer assemblies mounted in alinement with said endless belts, each trimmer assembly having a plurality of axially spaced journal supports mounted in alinement with the gaps in the divider elements of the compartment means, a rotatable hub mounted in at least one of said journal supports, a saw blade secured to said rotatable hub, and drive means connected to said hub for continuously rotating the saw blade.

5. The combination of claim 4 including a pair of rail members supporting said belts in the transversely tilted condition, a pair of lever elements mounted by the support and respectively connected to the rail members at opposite longitudinal sides of the support, and shaker means mounted by the support intermediate the lever elements for imparting balanced oscillations thereto.

6. The combination of claim 2 including a pair of rail members supporting said belts in the transversely tilted condition, a pair of lever elements mounted by the support and respectively connected to the rail members at opposite longitudinal sides of the support, and shaker means mounted by the support intermediate the lever elements for imparting balanced oscillations thereto.

7. In a machine for handling and trimming articles, an elongated support extending between a container loading station and an article severing station, a pair of container supporting conveyors disposed on opposite longitudinal sides of the support adapted to convey loaded containers from the loading station toward the severing station, means mounting said container supporting conveyors in transversely tilted positions to facilitate removal of articles in the loaded containers from opposite longitudinal sides of the support, a pair of endless belts mounted along said opposite longitudinal sides of the support for easy removal, and severing means operatively mounted by the support at the severing station for cutting articles positioned on the belts.

References Cited by the Examiner
UNITED STATES PATENTS

| | | | |
|---|---|---|---|
| 1,785,795 | 12/1930 | Stoppel | 146—81 |
| 1,950,729 | 3/1934 | Johnson | 146—81 |
| 2,564,056 | 8/1951 | Fahey | 209—125 X |
| 2,800,939 | 7/1957 | Vance | 146—82 |

ROBERT C. RIORDON, *Primary Examiner.*

WILLIE G. ABERCROMBIE, *Examiner.*